(12) United States Patent
Buchbut et al.

(10) Patent No.: US 10,050,690 B1
(45) Date of Patent: Aug. 14, 2018

(54) ADAPTIVE BEAM SWEEP IN VEHICLE WIRELESS CONNECTIVITY SYSTEM

(71) Applicant: GM Global Technology Operations LLC, Detroit, MI (US)

(72) Inventors: Yohay Buchbut, Pardes-Hanna (IL); Nadav Lavi, Ramat-Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/486,866

(22) Filed: Apr. 13, 2017

(51) Int. Cl.
*H04B 7/06* (2006.01)
*G07C 5/02* (2006.01)

(52) U.S. Cl.
CPC ............ *H04B 7/0617* (2013.01); *G07C 5/02* (2013.01); *G07C 2205/02* (2013.01)

(58) Field of Classification Search
CPC ..... H04B 7/0617; G07C 5/02; G07C 2205/02
USPC .......................................................... 375/267
See application file for complete search history.

(56) References Cited

U.S. PATENT DOCUMENTS

| | | | | |
|---|---|---|---|---|
| 5,917,446 A | * | 6/1999 | Greenspan | ............... H01Q 1/22 342/373 |
| 9,318,799 B2 | * | 4/2016 | Rousu | .................. H01Q 1/3275 |
| 2006/0145537 A1 | * | 7/2006 | Escott | ..................... B60R 11/02 307/10.1 |

* cited by examiner

*Primary Examiner* — Michael Neff
(74) *Attorney, Agent, or Firm* — Cantor Colburn LLP

(57) ABSTRACT

A multi-beam module and method of performing an adaptive beam sweep in a multi-beam module of a vehicle includes obtaining information about the vehicle. The information relates to a motion state of the vehicle. The method also includes determining whether a sector sweep by the multi-beam module should be a limited sector sweep that covers less than a 360 degree span collectively based on applying a rule to the information about the vehicle, and performing the limited sector sweep with beams that cover less than the 360 degree span collectively based on determining that the sector sweep should be the limited sector sweep.

18 Claims, 3 Drawing Sheets

ADAPTIVE BEAM SWEEP IN VEHICLE WIRELESS CONNECTIVITY SYSTEM

INTRODUCTION

The subject disclosure relates to an adaptive beam sweep in a vehicle wireless connectivity system.

A wireless connectivity system can utilize beamforming to increase transmission energy during communication. For example, IEEE 802.11ad is a wireless communication standard (referred to as WiGig) that uses a 60 gigahertz (GHz) frequency band and delivers data speeds up to 7 gigabytes per second. A WiGig router performs beamforming in order to focus the high frequency transmission and thereby increase the range and strength of the transmission. Generally, a sector sweep is performed until a compatible device is identified, and then the transmission is focused in a more narrow sector that targets that device. In a vehicle (e.g., automobile, farm equipment, construction equipment), WiGig can connect devices such as tablets to the in-vehicle entertainment system, for example. Unlike a WiGig router in a stationary location (e.g., building), a WiGig router in a moving vehicle experiences different conditions based on whether the vehicle is moving or stationary. Accordingly, it is desirable to provide an adaptive beam sweep in a vehicle WiGig system.

SUMMARY

In one exemplary embodiment, a method of performing an adaptive beam sweep in a multi-beam module of a vehicle includes obtaining information about the vehicle. The information relates to a motion state of the vehicle. The method also includes determining whether a sector sweep by the multi-beam module should be a limited sector sweep that covers less than a 360 degree span collectively based on applying a rule to the information about the vehicle. The limited sector sweep with beams that cover less than the 360 degree span collectively is performed based on determining that the sector sweep should be the limited sector sweep.

In addition to one or more of the features described herein, the obtaining the information includes obtaining a speed of the vehicle.

In addition to one or more of the features described herein, the applying the rule includes determining whether the speed of the vehicle is below a threshold speed.

In addition to one or more of the features described herein, the obtaining the information includes obtaining a gear status of the vehicle.

In addition to one or more of the features described herein, the applying the rule includes determining whether the gear status of the vehicle indicates that the vehicle is in a drive gear.

In addition to one or more of the features described herein, the obtaining the information includes obtaining an engine status of the vehicle.

In addition to one or more of the features described herein, the applying the rule includes determining whether the engine status of the vehicle indicates that the engine is on.

In addition to one or more of the features described herein, the performing the limited sector sweep includes prioritizing transmission among the beams that cover less than the 360 degree span collectively.

In addition to one or more of the features described herein, the performing the limited sector sweep includes selecting the beams based on which of all available beams transmit energy inside a passenger cabin of the vehicle.

In addition to one or more of the features described herein, performing the sector sweep to cover the 360 degree span is based on determining that the sector sweep should not be the limited sector sweep.

In another exemplary embodiment, a multi-beam module in a vehicle includes a processor to obtain information about the vehicle, the information relating to a motion state of the vehicle, and determine whether a sector sweep should be a limited sector sweep that covers less than a 360 degree span collectively based on applying a rule to the information about the vehicle. A transmitter performs a limited sector sweep with beams that cover less than the 360 degree span collectively based on the processor determining that the sector sweep should be the limited sector sweep.

In addition to one or more of the features described herein, the information is a speed of the vehicle.

In addition to one or more of the features described herein, the rule applied by the processor is whether the speed of the vehicle is below a threshold speed.

In addition to one or more of the features described herein, the information is a gear status of the vehicle.

In addition to one or more of the features described herein, the rule applied by the processor is whether the gear status of the vehicle indicates the vehicle is in a drive gear.

In addition to one or more of the features described herein, the information is an engine status of the vehicle.

In addition to one or more of the features described herein, the rule applied by the processor is whether the engine status of the vehicle indicates the engine is on.

In addition to one or more of the features described herein, the transmitter performing the limited sector sweep includes the processor selecting the beams based on which of all available beams transmit energy inside a passenger cabin of the vehicle.

In addition to one or more of the features described herein, the transmitter performing the limited sector sweep includes the processor prioritizing a subset of beams among the beams that cover less than the 360 degree span collectively such that the subset of beams transmits more frequently than other beams among the beams.

In addition to one or more of the features described herein, the multi-beam module operates within an IEEE 802.11ad standard.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

As previously noted, a WiGig router in a vehicle experiences different conditions when the vehicle is moving rather than stationary. Specifically, the beams in sectors that are outside the vehicle are superfluous while the vehicle is moving. While a WiGig router is discussed as an example, the WiGig module functions both as a router, to provide connectivity to devices in the vehicle, for example (e.g., a tablet), and as a client, to obtain content from a router outside the vehicle, for example (e.g., a content kiosk in a garage or at a gas station). Further, while a WiGig system is specifically referenced for explanatory purposes, the embodiments discussed herein pertain to any wireless connectivity system that performs beamforming and, in particular, a beam sweep process. The module that functions as a router or a client in such a wireless connectivity system is referred to herein as a multi-beam module. Embodiments of the systems and methods detailed herein relate to an adaptive beam sweep in a vehicle multi-beam module.

Figure 1:
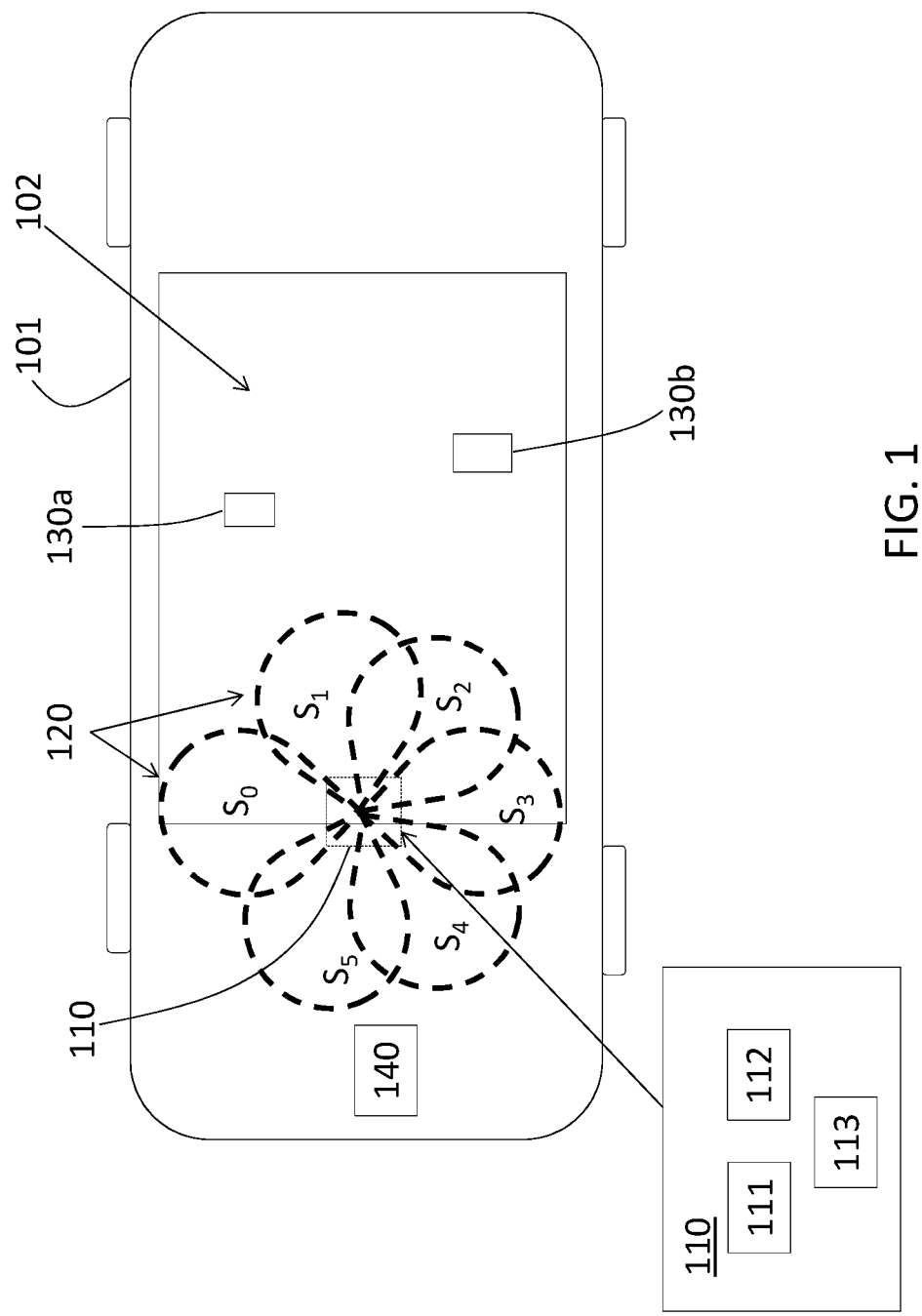
FIG. 1 is a block diagram of a vehicle with a multi-beam module according to embodiments.

In accordance with an exemplary embodiment, FIG. 1 illustrates a vehicle 101 with a multi-beam module 110. In the exemplary illustration, the multi-beam module 110 is in the dashboard of the vehicle 101 at one end of the passenger cabin 102. Two devices 130a, 130b (generally referred to as 130) that are compatible with the multi-beam module 110 (e.g., the IEEE 802.11ad standard when the multi-beam module 110 is a WiGig module) are shown within the passenger cabin 102 of the vehicle 101. Six beams 120 $S_0$ through $S_5$ are indicated. Generally, the multi-beam module 110 performs a sector sweep as an initial operation as well as during normal operation, as further detailed. During the sector sweep, the multi-beam module 110 may transmit in sectors corresponding with each of the $S_0$ through $S_5$ beams 120, for example. The beamforming is further detailed with reference to FIG. 2.

As FIG. 1 indicates, the $S_4$ and $S_5$ beams 120 are transmitted entirely outside the passenger cabin 102 of the vehicle 101. When the vehicle 101 is stationary, the $S_4$ and $S_5$ beams 120 may identify a content kiosk (e.g., at a gas station pump) or other device that communicates with the multi-beam module 110. However, when the vehicle 101 is moving, the $S_4$ and $S_5$ beams 120 become superfluous. As a result, the embodiments detailed further with reference to FIGS. 2 and 3 relate to an adaptive beam sweep. An information source 140 within the vehicle 101 is in communication with the multi-beam module 110 and indicates the movement status of the vehicle 101.

The information source 140 represents a number of known components of a vehicle 101 that provide movement status of the vehicle 101 in various forms. According to one embodiment, the information source 140 is the Controller Area Network (CAN bus) that facilitates extraction of speedometer readings, for example. According to an alternate or additional embodiment, the information source 140 may be the Electronic Control Unit (ECU) that indicates whether the vehicle 101 is moving. The information source 140 may provide information such as the location of the vehicle 101 based on a global positioning system (GPS) receiver, gear status of the vehicle 101 (e.g., an indication of whether the vehicle 101 is in drive or park), or operational mode (e.g., an indication of whether the engine is on or accessory mode is engaged). A set of rules may be used to control the adaptive beam sweep, as further details with reference to FIG. 2.

The multi-beam module 110 includes known components such as a transmitter 113 of the beams 120 and processing circuitry that controls the operation of the multi-beam module 110, including which beams 120 are transmitted. Information received (e.g., from a content kiosk, from a device 130 that is compatible with the multi-beam module 110) is also processed by the processing circuitry. The processing circuitry may include an application specific integrated circuit (ASIC), an electronic circuit, a processor 111 (shared, dedicated, or group) and memory 112 that executes one or more software or firmware programs, a combinational logic circuit, and/or other suitable components that provide the described functionality.

Figure 2:
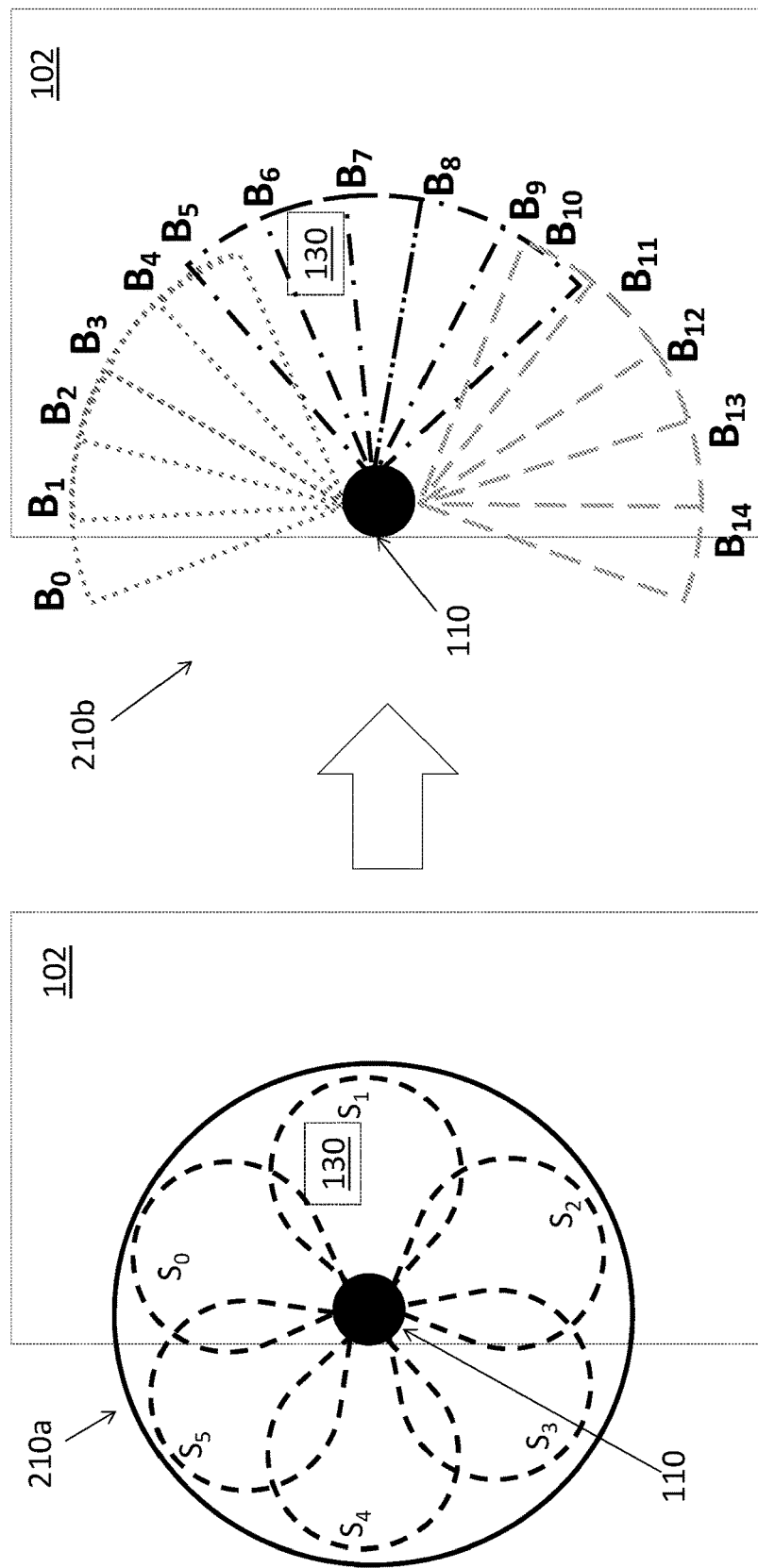
FIG. 2 is an illustration of exemplary beam sweeps according to embodiments.

FIG. 2 shows two beam sweeps 210a, 210b (generally referred to as 210) according to one or more embodiments. According to an exemplary embodiment, the multi-beam module 110 in the vehicle 101 performs the sector sweep 210a as an initial operation. Specifically, the multi-beam module 110 transmits beams 120 $S_0$ through $S_5$, in turn, until a device 130 is detected by one of the beams 120. Once a device 130 is detected by one of the beams 120 in the beam sweep 210a, then narrower beams 120, in the beam sweep 210b, associated with the beam 120 that resulted in detection of the device 130 are transmitted until the narrower beam 120 that corresponds with the device 130 location is identified. Narrower beams 120 $B_0$ through $B_{14}$ are shown for beam sweep 210b in FIG. 2. Once the narrower beam 120 that corresponds with the device 130 is identified, that narrower beam 120 will be used by the multi-beam module 110 until connection with the device 130 is dropped.

For example, during the initial beam sweep 210a, a device 130 is detected using the $S_1$ beam 120, as shown in FIG. 2. As a result, the sector sweep 210b is used. Specifically, the $B_5$ through $B_{10}$ beams 120, which are narrower beams 120 that cover the sector covered by the $S_1$ beam 120, as shown in FIG. 2, are transmitted to determine which of the $B_5$ through $B_{11}$ beams corresponds with the device 130. The narrower beam 120 ($B_6$ in the exemplary arrangement shown in FIG. 2) that is associated with the device 130 will then be used to communicate with the device 130.

The sector sweep 210a can be resumed for a number of reasons. When the connection with a device 130 is dropped, the sector sweep 210a is resumed until another device 130 is detected (or the same device 130 that was dropped is detected again) and the process described above is repeated. The sector sweep 210a may also be resumed periodically or based on a trigger. The trigger can be a broadcast by a device 130. In addition to the sector sweep 210, the multi-beam module 110 may include low-gain reception in all sectors continuously, for example. When this reception identifies a broadcast by a device 130, the sector sweep 210a can be triggered.

According to one or more embodiments, this process is modified according to rules regarding the status of the vehicle 101. For example, when the multi-beam module 110 is initialized, the vehicle 101 may be stationary. In that case, as described previously, the initial sector sweep 210a includes transmission of the $S_0$ through $S5$ beams 120. As also described previously, a connection is established and a narrower beam 120 (e.g., $B_8$) is used to communicate with the device 130. However, when one of the previously discussed conditions for performing the sector sweep 210a occurs (e.g., the initial connection to the device 130 using the narrow beam 120 is dropped, because the device is turned off), the vehicle 101 movement status is first checked and compared with predefined rules to adaptively adjust the sector sweep 210a.

The rules are applied to the data received from the information source 140. For example, when the vehicle 101 speed is known based on the information source 140, the rule may specify a full 360 degree sector sweep 210a (including the $S_4$ and $S_5$ beams 120) when the speed is below a predefined threshold and a limited sector sweep 210a when the speed is above the predefined threshold. The limited sector sweep 210a, according to the exemplary case shown in FIG. 2, includes the $S_0$, $S_1$, $S_2$, $S_3$, and $S_5$ beams 120. This is because the $S_4$ beam 120 is transmitted entirely outside the passenger cabin 102 of the vehicle 101 and is superfluous when the vehicle 101 is travelling above the threshold speed. As FIG. 2 indicates, the $S_3$ and $S_5$ beams 120 transmit energy mostly outside the passenger cabin 102. As such, a further prioritization in the sector sweep 210a may be imposed according to the rules. For example, the $S_3$ and $S_5$ beams 120 may be transmitted less frequently during the sector sweep 210a than the $S_0$, $S_1$, and $S_2$ beams 120.

As another example of a rule, the limited or limited and further prioritized sector sweep 210a described previously may be performed based simply on whether the vehicle 101 is in the drive gear, regardless of the speed of the vehicle 101. Similarly, the rule may specify a limited sector sweep 210a when the operation mode of the vehicle 101 is indicated to have the engine on. When a specified rule indicates that a limited sector sweep 210a should be used, the width and coverage area of the beams 120 in a given sector sweep 210 determines which beams 120 are or are not transmitted in a sector sweep 210 according to the rule.

Figure 3:
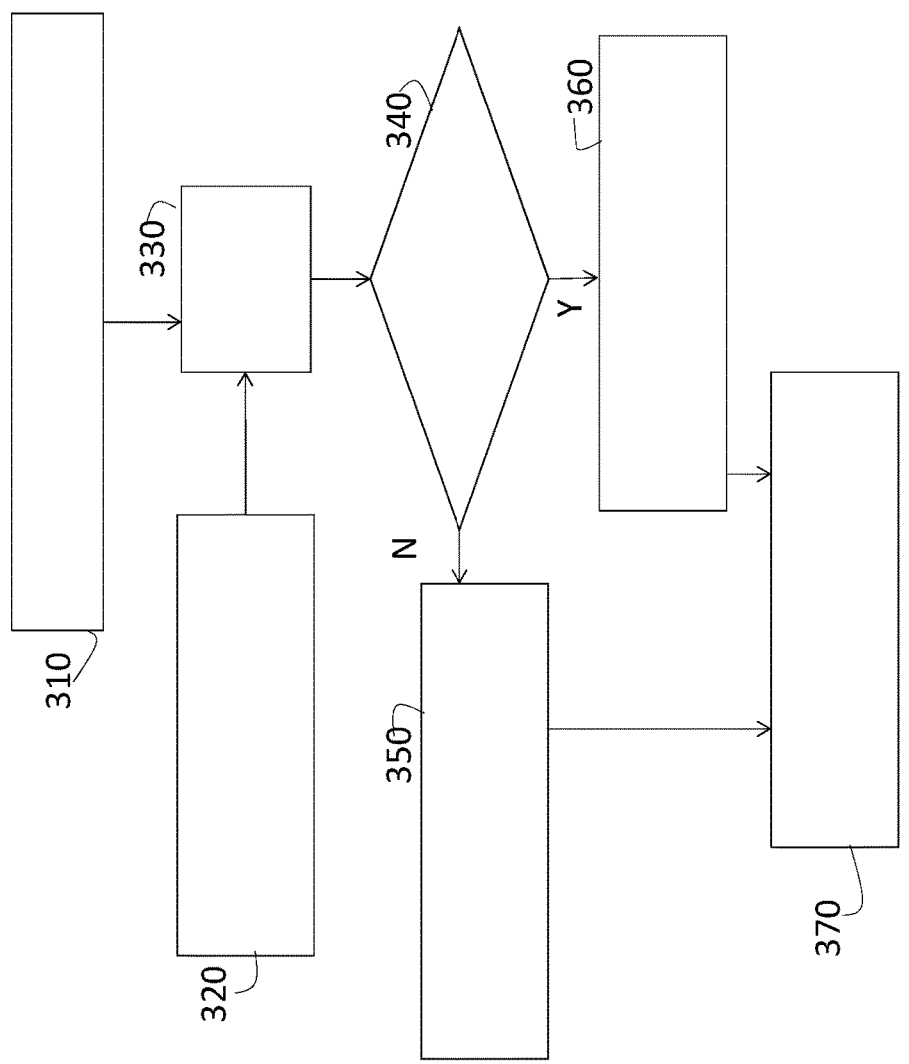
FIG. 3 is a process flow of a method of performing an adaptive beam sweep in a vehicle multi-beam module according to one or more embodiments.

FIG. 3 is a process flow of a method of performing an adaptive beam sweep in a vehicle multi-beam module 110 according to one or more embodiments. At block 310, detecting a condition to start a sector sweep 210a refers to detecting the start of a period, when the sector sweep 210a is done periodically, detecting a trigger (e.g., broadcast by a device 130), or not having a current connection to any device 130, either due to dropping the connection or not yet having detected a device 130. Obtaining vehicle information, at block 320, refers to obtaining information from the information source 140 discussed previously. As noted, this information can indicate speed of the vehicle 101, location, engine status, or other information that provides insight into whether the multi-beam module 110 is likely to connect only within the passenger cabin 102 of the vehicle 101.

At block 330, applying a rule refers to using one of the previously discussed rules in conjunction with vehicle information. For example, the whether or not the vehicle speed exceeds a threshold may be determined. At block 340, a determination is made, based on the rule at block 330, as to whether the sector sweep 210a should be limited. If the sector sweep 210a should not be limited to only certain beams 120, then performing the sector sweep 210a with all beams 120, at block 350, refers to covering all 360 degrees with the sector sweep 210a (using $S_0$ through $S_5$ in FIG. 2). If the sector sweep 210a should be limited, then performing the limited or limited and prioritized sector sweep 210a, at block 360, refers to using only those beams 120 that transmit within the passenger cabin 102 of the vehicle 101.

At block 370, determining and using a narrow beam 120 for communication refers to the process of performing sector sweep 210b to further focus the energy once a device 130 or content kiosk has been found through the sector sweep 210a. The sector sweep 210b is limited to one or more sectors, during sector sweep 210a, that indicated the potential presence of a compatible component (e.g., device 130, content kiosk). The processes shown in FIG. 3 are iterative, because, as previously noted, detecting a condition to start a sector sweep 210a, at block 310, can occur at any time (e.g., the communication based on block 370 can be dropped, a time for performing a periodic sector sweep 210a may be indicated, a trigger event may be detected).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of performing an adaptive beam sweep in a multi-beam module of a vehicle, the method comprising:
obtaining information about the vehicle, wherein the information relates to a motion state of the vehicle;
determining whether a sector sweep by the multi-beam module should be a limited sector sweep that covers less than a 360 degree span collectively based on applying a rule to the information about the motion state of the vehicle; and
performing the limited sector sweep with beams that cover less than the 360 degree span collectively based on determining that the sector sweep should be the limited sector sweep, wherein the performing the limited sector sweep includes selecting the beams based on which of all available beams transmit energy inside a passenger cabin of the vehicle.

2. The method according to claim 1, wherein the obtaining the information includes obtaining a speed of the vehicle.

3. The method according to claim 2, wherein the applying the rule includes determining whether the speed of the vehicle is below a threshold speed.

4. The method according to claim 1, wherein the obtaining the information includes obtaining a gear status of the vehicle.

5. The method according to claim 4, wherein the applying the rule includes determining whether the gear status of the vehicle indicates that the vehicle is in a drive gear.

6. The method according to claim 1, wherein the obtaining the information includes obtaining an engine status of the vehicle.

7. The method according to claim 6, wherein the applying the rule includes determining whether the engine status of the vehicle indicates that the engine is on.

8. The method according to claim 1, wherein the performing the limited sector sweep includes prioritizing transmission among the beams that cover less than the 360 degree span collectively.

9. The method according to claim 1, further comprising performing the sector sweep to cover the 360 degree span based on determining that the sector sweep should not be the limited sector sweep.

10. A multi-beam module in a vehicle, comprising:
a processor configured to obtain information about the vehicle, the information relating to a motion state of the vehicle, and determine whether a sector sweep should be a limited sector sweep that covers less than a 360 degree span collectively based on applying a rule to the information about the motion state of the vehicle; and
a transmitter configured to perform a limited sector sweep with beams that cover less than the 360 degree span collectively based on the processor determining that the sector sweep should be the limited sector sweep, wherein the transmitter performing the limited sector sweep includes the processor selecting the beams based on which of all available beams transmit energy inside a passenger cabin of the vehicle.

11. The multi-beam module according to claim 10, wherein the information is a speed of the vehicle.

12. The multi-beam module according to claim 11, wherein the rule applied by the processor is whether the speed of the vehicle is below a threshold speed.

13. The multi-beam module according to claim 10, wherein the information is a gear status of the vehicle.

14. The multi-beam module according to claim 13, wherein the rule applied by the processor is whether the gear status of the vehicle indicates the vehicle is in a drive gear.

15. The multi-beam module according to claim 10, wherein the information is an engine status of the vehicle.

16. The multi-beam module according to claim 15, wherein the rule applied by the processor is whether the engine status of the vehicle indicates the engine is on.

17. The multi-beam module according to claim 10, wherein the transmitter performing the limited sector sweep includes the processor prioritizing a subset of beams among the beams that cover less than the 360 degree span collectively such that the subset of beams transmits more frequently than other beams among the beams.

18. The multi-beam module according to claim 10, wherein the multi-beam module operates within an IEEE 802.11ad standard.

* * * * *